(12) United States Patent
Kramer et al.

(10) Patent No.: US 8,499,447 B2
(45) Date of Patent: Aug. 6, 2013

(54) REPAIR METHOD FOR CORRODED ENGINE CYLINDER HEAD

(75) Inventors: Martin S. Kramer, Clarkston, MI (US); Roger L. Briggs, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 456 days.

(21) Appl. No.: 12/856,116

(22) Filed: Aug. 13, 2010

(65) Prior Publication Data

US 2012/0036715 A1 Feb. 16, 2012

(51) Int. Cl.
*B23P 6/00* (2006.01)

(52) U.S. Cl.
USPC ............... 29/888.011; 29/888.01; 29/888.6; 29/402.09; 29/402.11; 123/193.2

(58) Field of Classification Search
USPC ............. 29/888.01, 888.011, 890.09, 888.06, 29/402.09, 402.11; 123/193.2
See application file for complete search history.

(56) References Cited

U.S. PATENT DOCUMENTS

| | | | | |
|---|---|---|---|---|
| 4,697,786 A | * | 10/1987 | Kennedy | 251/309 |
| 5,626,674 A | * | 5/1997 | VanKuiken et al. | 118/317 |
| 5,766,693 A | * | 6/1998 | Rao | 427/454 |
| 5,802,716 A | * | 9/1998 | Nishimura et al. | 29/888.06 |
| 6,395,090 B1 | * | 5/2002 | Shepley et al. | 118/504 |
| 7,278,639 B2 | * | 10/2007 | Forry et al. | 277/596 |
| 7,401,404 B2 | * | 7/2008 | Yetter et al. | 29/888.3 |
| 7,415,958 B2 | * | 8/2008 | Boehm et al. | 123/193.2 |
| 7,698,818 B2 | * | 4/2010 | Voegele et al. | 29/898.07 |
| 7,712,216 B1 | * | 5/2010 | Woehlke et al. | 29/888.011 |

\* cited by examiner

*Primary Examiner* — Richard Chang

(57) ABSTRACT

A method is provided for repairing a cylinder head having corrosion and erosion of the gasket sealing surface around the coolant inlet. The engine is disassembled and the corroded material is machined to a selected depth and width creating a pocket having a bottom wall surface and an annular side wall surface surrounding the coolant inlet port. An annular insert is provided having an annular outer side wall, a top wall, a bottom wall, and a central opening. The insert has a thickness greater than the depth of the machined pocket. An adhesive is applied the insert is pressed into the pocket. After curing of the adhesive, the top wall of the insert is machined to a dimension flush with the sealing surface of the head thereby creating a proper sealing surface for the subsequent seating of a replacement gasket.

20 Claims, 4 Drawing Sheets

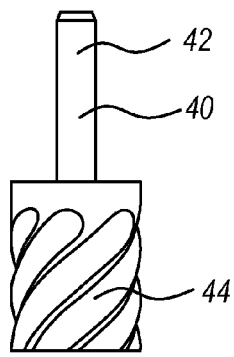
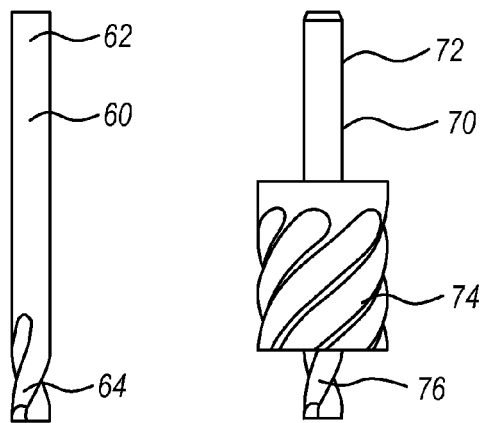
FIG. 4A    FIG. 5A    FIG. 5B
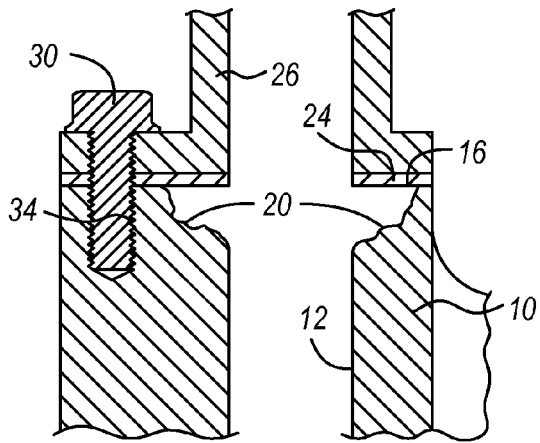
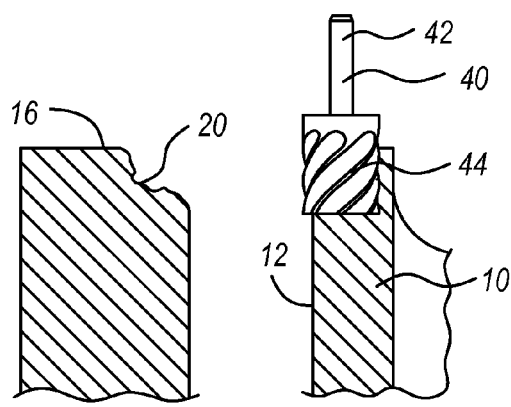
FIG. 3    FIG. 4
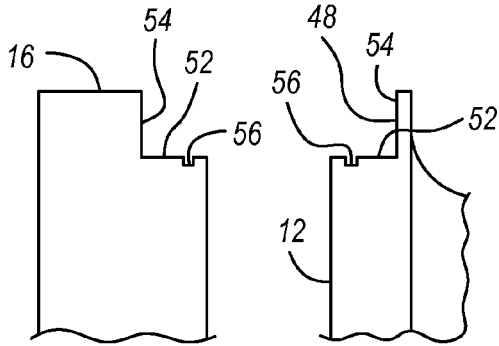
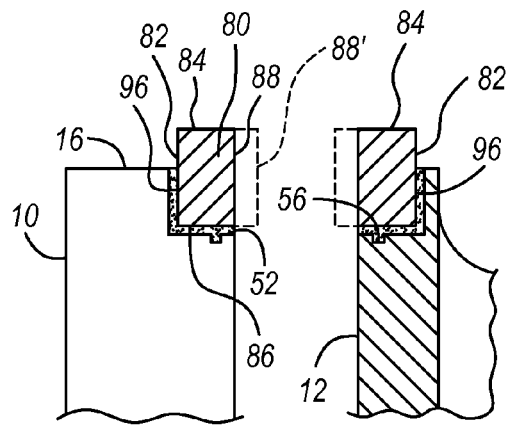
FIG. 5    FIG. 11

REPAIR METHOD FOR CORRODED ENGINE CYLINDER HEAD

FIELD OF THE INVENTION

The present invention relates to a method for repairing an engine cylinder head having corrosion and erosion at the engine coolant port of the cylinder head.

BACKGROUND OF THE INVENTION

Vehicle engines typically have an aluminum cylinder head that bolts atop the engine block and has coolant inlet ports for providing engine coolant into the engine block. A machined deck surrounds the coolant inlet ports and provides a sealing surface against which a coolant-sealing gasket is seated. A coolant header presses against the sealing gasket and is bolted to the cylinder head so that engine coolant that enters through the header will then flow through the coolant inlet port. Over time, particularly when improper coolant change intervals have been observed, the aluminum material of the engine head surrounding the coolant inlet port may become corroded and eroded, and thereby no longer provide an effective sealing surface for contact by the coolant sealing gasket.

The common industry practice is to remove the coolant header and the gasket and then machine the sealing surface in an attempt to remove the corrosion pits. In general, however, material removal from the gasket sealing surface should not exceed about 0.014 inches. Thus, in case of more severe corrosion and erosion, the aluminum cylinder head must be removed and discarded and replaced with a costly replacement aluminum cylinder head.

It would be desirable to provide a new and improved method for repairing a corroded engine cylinder head rather than requiring the entire replacement of the cylinder head with a new and costly replacement part.

SUMMARY OF THE INVENTION

A method is provided for repairing a cylinder head having corrosion and erosion of the gasket sealing surface around the coolant inlet. The engine is disassembled and the corroded material is machined away to a selected depth and width creating a pocket having a bottom wall surface and an annular side wall surface surrounding the coolant inlet. An annular insert is provided having an annular outer side wall, a top wall, a bottom wall, and a central opening. The insert has a thickness greater than the depth of the machined pocket. An adhesive is applied and the insert is pressed into the pocket. After curing of the adhesive, the top wall of the insert is machined to a dimension flush with the sealing surface of the head thereby creating a proper sealing surface for the subsequent seating of a replacement gasket.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a section view taken in the direction of arrows 3-3 of FIG. 2, showing the corrosion, and also showing the sealing gasket and the coolant header.

FIG. 4 is a section view through the cylinder head at the coolant inlet port and showing a machine tool cutting away the corroded and eroded aluminum material to provide a machined pocket surrounding the coolant inlet port.

FIG. 4A is an elevation view of the machine tool.

FIG. 5 shows a cross section through the cylinder head at the inlet port with the finished pocket formed therein.

FIG. 5A is an elevation view of a machine tool for forming a groove in the machined pocket.

FIG. 5B is an elevation view of machine tool for simultaneously cutting both the pocket and a groove.

And FIG. 11 is a cross-section view taken in the direction of arrows 11-11 of FIG. 8 showing the insert adhered within the machined pocket of the engine cylinder head and ready to be machined to a height flush with the gasket sealing surface.

SUMMARY OF THE INVENTION

Figure 1:
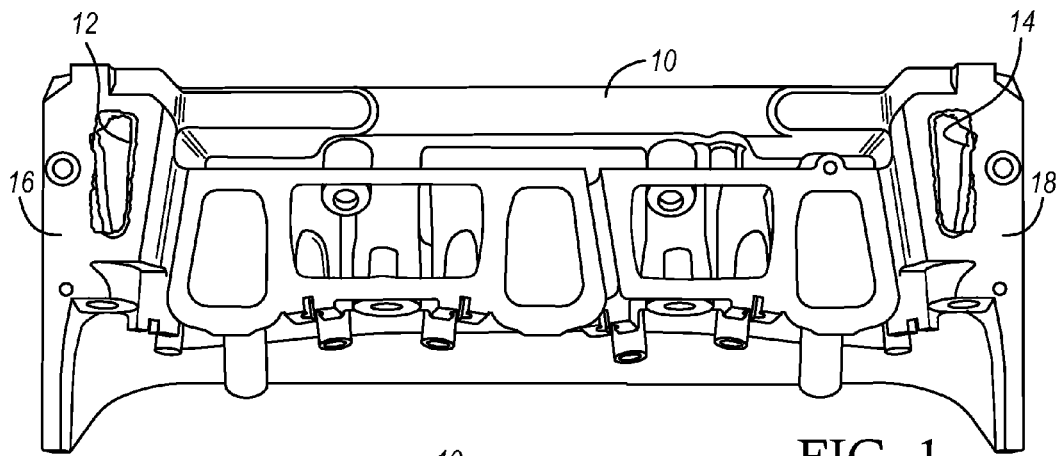
FIG. 1 is a top view of a typical engine cylinder head having a corroded sealing surface surrounding the coolant inlet port.

Referring to FIG. 1, an engine cylinder head 10 is shown and includes a left coolant port 12 and a right coolant port 14, which will receive a flow of engine coolant for cooling the engine block. The cylinder head 10 has a machined sealing surface at 16 that surrounds the coolant inlet port 14 and a similar sealing surface 18 that surrounds the cooling inlet port 14. The cylinder heads 10 is typically made of aluminum, AA319. This aluminum alloy is highly castable and machinable and is, therefore, the material of choice.

Figure 2:
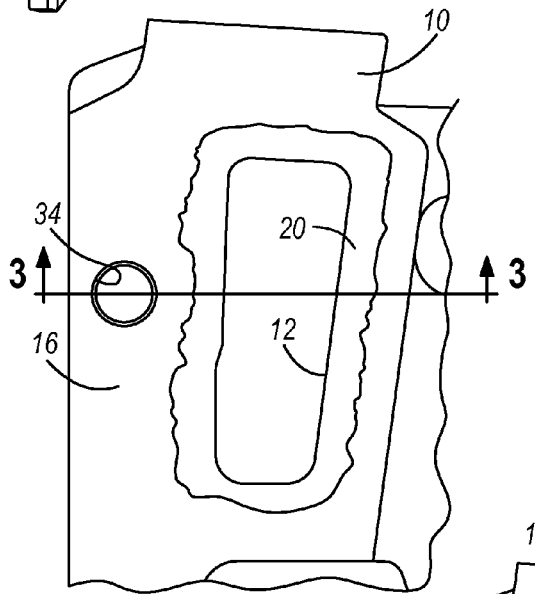
FIG. 2 is an enlarged view of the coolant inlet port of FIG. 1 showing the corroded and eroded sealing surface.

FIGS. 2 and 3, the drawings show that the aluminum material surrounding the coolant port 12 has become corroded and eroded away as shown at 20. As seen in FIG. 3, a gasket 24 is seated between the sealing surface 16 and an inlet header 26 that is bolted onto the cylinder head 10 by bolt 30 that extends into threaded hole 34 in the sealing surface 16. Because of the corrosion and erosion, the gasket 24 is no longer supported and may no longer provide its critical sealing function, and, therefore, the cylinder head 10 will need to be disassembled to make a repair.

Traditionally, the sealing surface 16 can be re-machined, but only to a maximum of the removal of 0.014 inches of material. It can be seen from FIGS. 2 and 3 that the aluminum material closely surrounding the inlet port 12 has corroded and eroded away to a greater extent so that it is inevitable that the engine cylinder head 10 will need to be replaced in its entirety.

The present invention provides a new method for enabling the repair of the cylinder head to thereby eliminate the need to entirely replace the cylinder head with a new and expensive replacement part.

Referring to FIGS. 4 and 4A, it is seen that a machine tool 40 includes a drive shaft 42 and a milling head 44. The machining tool 40 is mounted in a conventional numerically controlled machining center, not shown, and as shown in FIG. 4, is thrust into the cylinder head 10 to cut away the corroded and eroded material.

Thus, as seen in FIG. 5, a machine pocket 48 is provided all around the circumference of the inlet port 12 and includes a bottom wall surface 52 and an annular sidewall surface 54. In addition, FIG. 5 shows a groove 56 that is machined into the bottom wall surface 52 by a machine tool 60 shown in FIG. 5A. As seen in FIG. 5A, the machine tool 60 includes a shaft 62 and a milling head 64. The milling head 64 may be flat at the end to make a flat bottomed groove as shown in FIG. 5, or may be rounded in shape to make a round bottom groove. Alternatively, a machine tool 70 shown in FIG. 5B can machine the pocket 48 and the groove 56 simultaneously. The machine tool 70 includes a shaft 72, a pocket forming milling head 74, and a groove-forming milling head portion 76.

Figure 6:
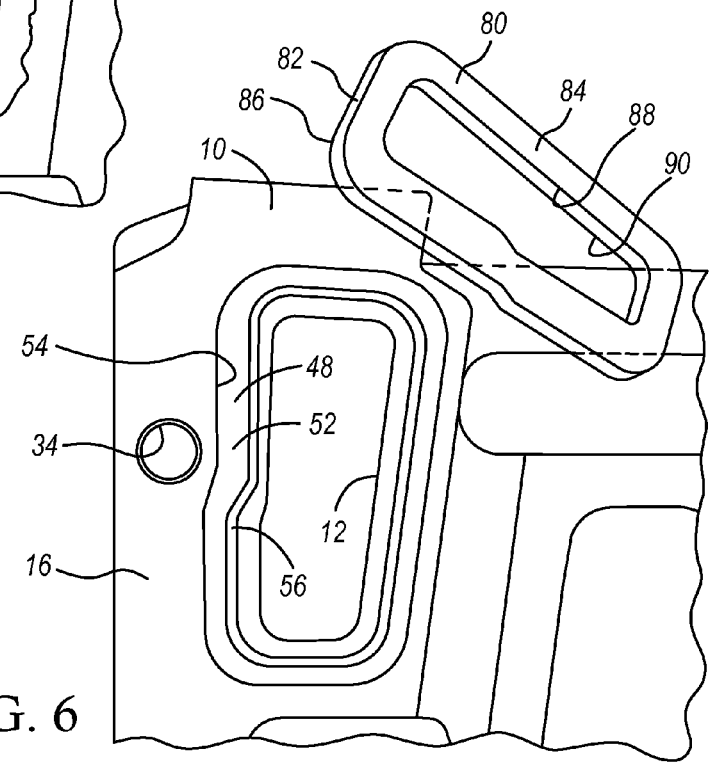
FIG. 6 shows a plan view of the cylinder head with the newly machined pocket and also an aluminum insert that is poised for installation into the newly machined pocket.

Referring to FIG. 6, is seen that the machining of the pocket 48 into the cylinder head 10 has been effective to remove all of the corroded and eroded aluminum that had been seen in FIGS. 2 and 3. FIG. 6 also shows an annular insert 80 that has been separately machined and manufactured preferably of AA3003 aluminum alloy. As seen in FIG. 6, the annular insert 80 includes an annular outer sidewall 82, a top wall 84, a bottom wall 86, and an annular inner sidewall 88 that defines a central coolant opening 90. The annular insert 80 has a thickness that is greater than the depth of the annular sidewall surface 54 of the pocket 48.

Figure 7:
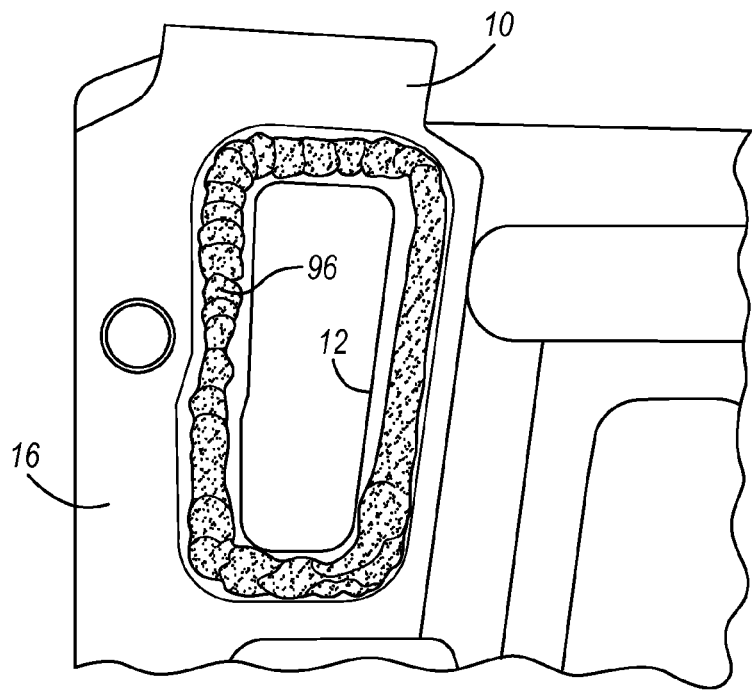
FIG. 7 is a view similar to FIG. 6 but showing a bead of adhesive dispensed into the machined pocket.
Figure 8:
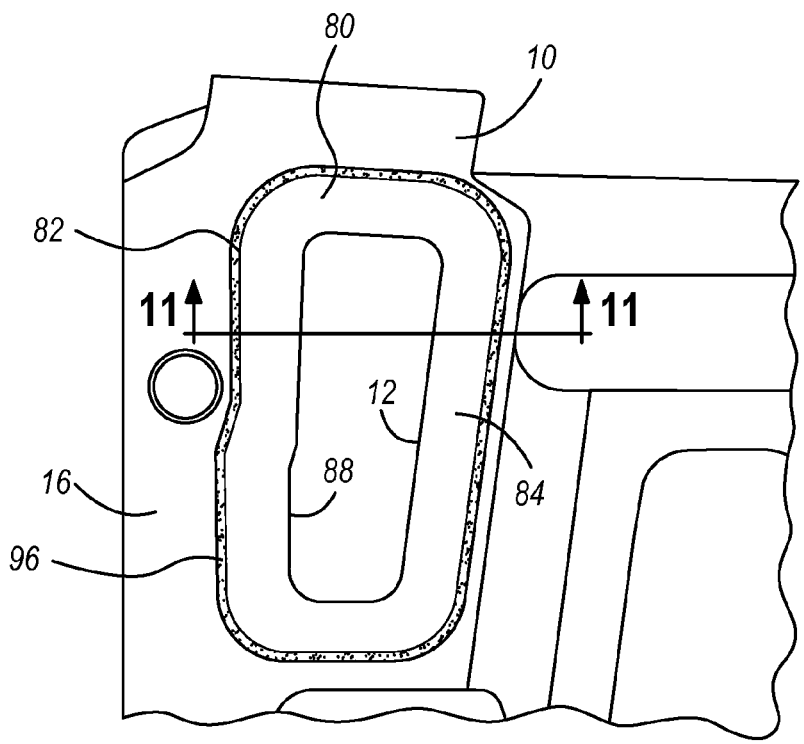
FIG. 8 is a plan view showing the insert pressed into the pocket.

As seen in FIG. 7, a bead 96 of suitable adhesive is dispensed into the pocket 48 to seat upon the bottom wall 52 of the pocket 48 and within the groove 56 thereof. The adhesive 96 may be an anaerobic adhesive, including a UV cured type such as ThreeBond 1373N or an RTV type adhesive such as ThreeBond 1207G or ThreeBond 1217F, manufactured by ThreeBond International Inc, Cincinnati Ohio. Then, in FIG. 8, the annular insert 80 has been pressed into the pocket 48 to contact with the adhesive bead 96.

Figure 9:
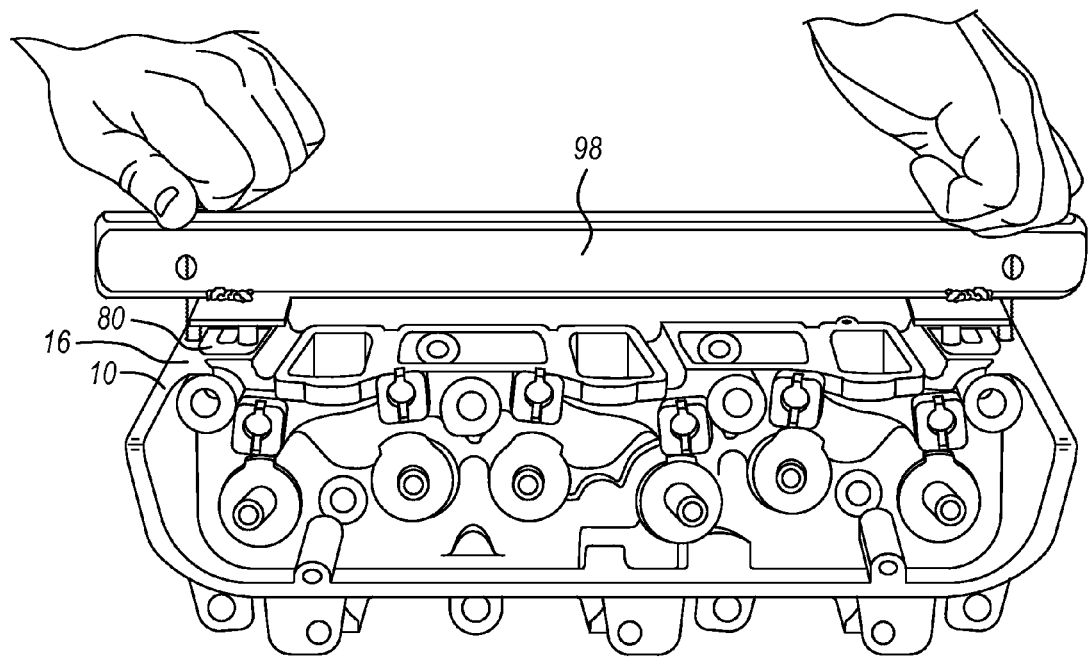
FIG. 9 shows a clamp that is installed onto the engine head to force the insert into the pocket and ensure distribution of the adhesive.
Figure 10:
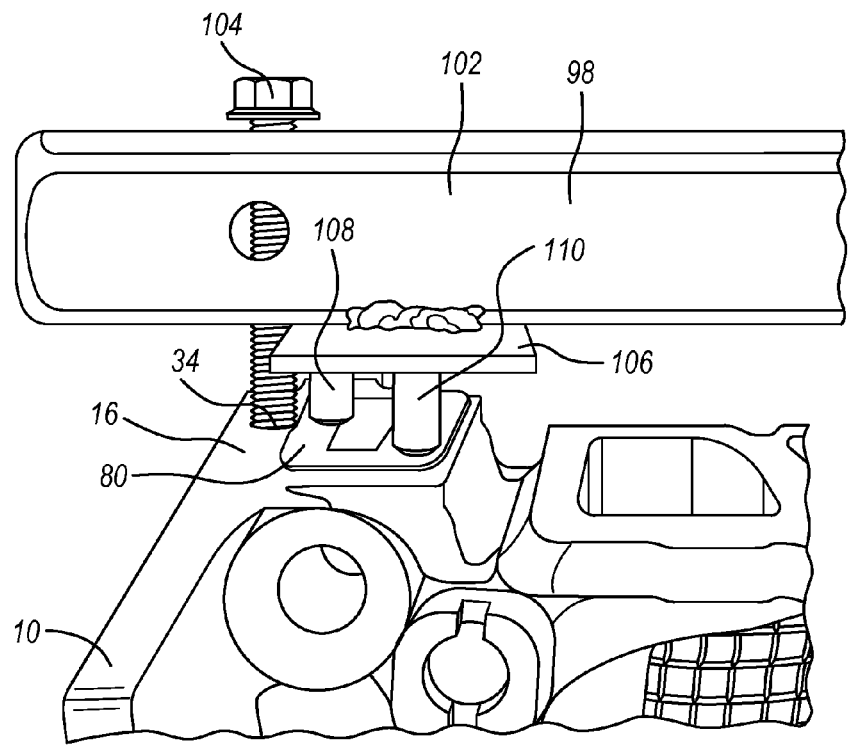
FIG. 10 is an enlarged fragmentary view of the clamp of FIG. 9.

Referring to FIGS. 9 and 10, it is seen that a clamping device 98 is applied to the cylinder head 10 to press downwardly on the annular insert 80 during curing of the adhesive 96. In particular, as best seen in FIG. 10, the clamping device 98 includes a bar 102 that is mounted on the cylinder head 10 by threading a bolt 104 into the threaded aperture 34. The clamping bar 102 carries a clamping plate 106 that has fingers 108 and 110 projecting downwardly to contact with the annular insert 80 and press it into the adhesive 96 while the adhesive is cured.

As shown in FIG. 11, the annular insert 80 is now permanently attached within the pocket 48 of the cylinder head 10. The adhesive 96 has been distributed via the pressing of the annular insert 80 into the pocket 48 such that the adhesive 96 completely covers the bottom wall 86 of the annular insert 80 and also rises into the space between the annular sidewall surface 54 of the pocket 48 and the annular outer sidewall 82 of the annular insert 80 so that the annular insert 80 is adhered to the cylinder head 10 at both the bottom surfaces and the side surfaces. In addition, as seen in FIG. 11, the annular insert 80 has been designed to have a thickness such that when it is adhered within the pocket 48, the top wall 84 of the annular insert 80 is positioned above the corresponding sealing surface 16 of the engine head 10.

A machine tool, not shown is then is applied to cut away the height of the top wall 84 of the annular insert 80 so that the annular insert 80 is machined to bring the top wall 84 into flush relationship with the sealing surface 16. If desired, the sealing surface 16 may also be slightly machine-finished in order to ensure that the top wall 84 of the insert 80 and the sealing surface 16 are both of optimum quality to define a new sealing surface 16 for the application of a new sealing gasket 24 there against.

Thus it is seen that the invention has provided a new and improved method for repairing an aluminum engine head so that the cost of an entirely new replacement engine head can be avoided.

If desired, the annular insert 80 can be dimensioned such that the inner annular wall 88 will overhang and cantilever beyond the wall of the coolant inlet port 12, as shown in dashed lines in FIG. 11 and designated 88', to thereby provide a larger sealant gasket sealing surface 16 than had been provided in the original equipment engine head.

Furthermore, it will be appreciated that the adhesion of the annular insert 80 within the machined pocket 48 of the cylinder head 10 can be enhanced by providing a roughened or textured surface on the walls of the pocket 48 or the walls of the annular insert 80. For example, grit blasting may be employed on the bottom wall 86 of the annular insert 80 and/or the outer sidewalls 82 of the insert 80 in order to provide enhanced adhesion of the insert 80 into the machined pocket 48 of the cylinder head 10.

In addition, it will be understood that, if desired, the adhesive that is shown in FIG. 7 as dispensed into the pocket 48 could, alternatively, be dispensed onto the bottom wall 86 of the annular insert 80.

What is claimed is:

1. A method for repairing an engine cylinder head where a leakage of engine coolant around a coolant inlet port has caused the corrosion and erosion of a sealing surface of the engine cylinder head against which a coolant sealing gasket is seated, so that a new sealing surface is provided for properly seating a replacement gasket, comprising;

disassembling an engine cylinder head to expose a corroded and eroded sealing surface that is surrounding a coolant inlet port;

machining away the corroded and eroded sealing surface to a selected depth and width to create a newly machined pocket having a bottom wall surface and an annular sidewall surface that surrounds the coolant inlet port;

providing an annular insert having an annular outer sidewall, a top wall, a bottom wall, and a central opening, said insert having a thickness that is greater than the depth of the machined pocket;

applying an adhesive to either the engine cylinder head within the pocket or to the insert;

inserting the insert into the pocket and curing the adhesive so that the insert is permanently adhered within the machined pocket;

and after curing the adhesive, machining the top wall of the insert to a dimension that will create a proper gasket surface for the subsequent seating of a replacement gasket.

2. The method of claim 1 further comprising machining a groove in the bottom wall surface of the pocket to receive the adhesive.

3. The method of claim 2 further comprising machining the pocket via a first machining tool for machining the pocket and a second machining tool for machining the groove.

4. The method of claim 2 further comprising machining the pocket and the groove simultaneously by a single machining tool.

5. The method of claim 1 further comprising applying a clamp onto the engine cylinder head to engage with the insert and press the insert into the pocket until the adhesive is cured.

6. The method of claim 1 further comprising at least of the bottom wall and the annular outer sidewall of the insert being roughened to provide a roughened surface for contact with the adhesive.

7. The method of claim 6 further comprising providing the roughened surface by grit blasting.

8. The method of claim 1 further comprising the adhesive being provided in a volume sufficient that upon insertion of the insert the adhesive will flow to act between the both the bottom wall of the insert and the bottom wall surface of the pocket and also between the annular outer sidewall of the insert and the annular sidewall surface of the pocket.

9. The method of claim 1 further comprising the insert having a dimension between the annular outer sidewall and the central opening such that the insert will be cantilevered inwardly of the coolant inlet port and thereby provide a top wall defining an gasket sealing surface that is larger than the gasket sealing surface that was corroded and eroded so that a larger replacement gasket can be installed.

10. The method of claim 1 further comprising the adhesive being an anaerobic adhesive and UV cured.

11. The method of claim 1 further comprising the adhesive being an RTV adhesive.

12. The method of claim 1 further comprising enhancing the adhesion of the insert within the pocket by grit blasting of at least the bottom wall of the insert to provide a roughened surface for contact with the adhesive and also applying a clamp to engage with the insert and press the insert into the pocket until the adhesive is cured.

13. The method of claim 1 further comprising grit blasting of at least the bottom wall of the insert to provide a roughened surface for contact with the adhesive, and the adhesive being provided in a volume sufficient that upon insertion of the insert the adhesive will flow to act between the both the bottom wall of the insert and the bottom wall surface of the pocket and also between the annular outer sidewall of the insert and the annular sidewall surface of the pocket.

14. The method of claim 1 further comprising the adhesive being provided in a volume sufficient that upon insertion of the insert the adhesive will flow to act between both the bottom wall of the insert and the bottom wall surface of the pocket and also between the annular outer sidewall of the insert and the annular sidewall surface of the pocket, and applying a clamp to engage with the insert and press the insert into the pocket until the adhesive is cured.

15. The method of claim 1 further comprising grit blasting of at least the bottom wall of the insert to provide a roughened surface for contact with the adhesive, the adhesive being provided in a volume sufficient that upon insertion of the insert the adhesive will flow to act between the both the bottom wall of the insert and the bottom wall surface of the pocket and also between the annular outer sidewall of the insert and the annular sidewall surface of the pocket, and applying a clamp to engage with the insert and press the insert into the pocket until the adhesive is cured.

16. A method for repairing an engine cylinder head where a leakage of engine coolant around a coolant inlet port has caused the corrosion and erosion of a sealing surface of the head against which a coolant sealing gasket is seated, so that a new sealing surface is provided for properly seating a replacement gasket, comprising;

disassembling an engine cylinder head to expose a corroded and eroded sealing surface that is surrounding a coolant inlet port;

machining away the corroded and eroded sealing surface to a selected depth and width to create a newly machined pocket having a bottom wall surface and an annular side wall surface that surrounds the coolant inlet port;

machining a groove in the bottom wall surface;

providing an annular insert having an annular outer sidewall, a top wall, a bottom wall, and a central opening, said insert having a thickness that is greater than the depth of the machined pocket and a width of the annular outer sidewall that is less than the width of the machined pocket;

applying an adhesive to either the engine cylinder head within the pocket or to the insert;

inserting the insert into the pocket and curing the adhesive so that the insert is permanently adhered within the machined pocket;

and after curing the adhesive, machining the top wall of the insert to a dimension that will create a proper gasket surface for the subsequent seating of a replacement gasket.

17. The method of claim 16 further comprising a first machining tool for machining the pocket and a second machining tool for machining the groove.

18. The method of claim 16 further comprising machining the pocket and the groove simultaneously by a single machining tool.

19. The method of claim 16 further comprising applying a clamp onto the engine cylinder head to engage with the insert and press the insert into the pocket until the adhesive is cured.

20. A method for repairing an engine cylinder head where the leakage of engine coolant around a coolant inlet port has caused the corrosion and erosion of a sealing surface of the head against which a coolant sealing gasket is seated, so that a new sealing surface is provided for properly seating a replacement gasket, comprising;

disassembling an engine cylinder head from an engine to expose a corroded and eroded sealing surface that is surrounding a coolant inlet port;

machining away the corroded and eroded sealing surface to a selected depth and width to create a newly machined pocket having a bottom wall surface and an annular sidewall surface that surrounds the coolant inlet port;

machining a groove in the bottom wall surface;

providing an annular insert having an annular outer sidewall, a top wall, a bottom wall, and a central opening, said insert having a thickness that is greater than the depth of the machined pocket and an width of the annular outer sidewall that is less than the width of the machined pocket;

grit blasting the bottom wall of the insert;

applying an adhesive to either the head within the pocket or to the insert;

inserting the insert into the pocket and curing the adhesive so that the insert is permanently adhered within the machined pocket;

and after curing the adhesive, machining the top wall of the insert to a dimension that will create a proper gasket surface for the subsequent seating of a replacement gasket.

* * * * *